US012801464B2

(12) United States Patent
Xiong et al.

(10) Patent No.: US 12,801,464 B2
(45) Date of Patent: Nov. 17, 2026

(54) FLEXIBLE SERVER MANAGEMENT IN CLUSTER ENVIRONMENT

(71) Applicant: Dell Products L.P., Round Rock, TX (US)

(72) Inventors: Joan Jun Xiong, Shanghai (CN); Zheng Zhang, Shanghai (CN); YungChin Fang, Austin, TX (US); Neil Tang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 670 days.

(21) Appl. No.: 17/574,410

(22) Filed: Jan. 12, 2022

(65) Prior Publication Data

US 2023/0221976 A1 Jul. 13, 2023

(51) Int. Cl.

| | |
|---|---|
| ***G06F 9/54*** | (2006.01) |
| ***G06F 9/455*** | (2018.01) |
| ***G06F 13/38*** | (2006.01) |
| ***H04L 67/56*** | (2022.01) |

(52) U.S. Cl.

CPC ............ *G06F 9/54* (2013.01); *G06F 9/45558* (2013.01); *G06F 13/382* (2013.01); *H04L 67/56* (2022.05); *G06F 2213/0042* (2013.01)

(58) Field of Classification Search

CPC .. G06F 9/54; G06F 13/382; G06F 2213/0042; G06F 2009/45579; H04L 67/56

See application file for complete search history.

(56) References Cited

U.S. PATENT DOCUMENTS

| | | | | |
|---|---|---|---|---|
| 8,381,217 | B1 * | 2/2013 | Wijayaratne | G06F 9/50 718/102 |
| 8,560,686 | B2 * | 10/2013 | Ramamurthy | H04L 41/344 709/227 |
| 9,191,454 | B2 * | 11/2015 | Fries | H04L 67/59 |
| 10,620,941 | B2 * | 4/2020 | Ali | G06F 11/1433 |
| 10,623,395 | B2 * | 4/2020 | Saha | G06F 21/71 |
| 10,997,092 | B2 * | 5/2021 | Sahu | G06F 3/0659 |
| 2019/0004901 | A1 * | 1/2019 | Ryan | G06F 1/3253 |
| 2019/0379656 | A1 * | 12/2019 | Gore | H04L 63/0815 |

* cited by examiner

*Primary Examiner* — Lewis A Bullock, Jr.
*Assistant Examiner* — John Robert Dakita Ewald
(74) *Attorney, Agent, or Firm* — Jackson Walker L.L.P.

(57) ABSTRACT

An information handling system may include at least one processor and a memory. The information handling system may be configured to: receive, from a cluster management client, a request for functionality that is implemented at a management controller; and execute a proxy configured to: transmit the request to the management controller; receive a response from the management controller; and transmit the response to the cluster management client.

18 Claims, 3 Drawing Sheets

FLEXIBLE SERVER MANAGEMENT IN CLUSTER ENVIRONMENT

TECHNICAL FIELD

The present disclosure relates in general to information handling systems, and more particularly to the management of clusters of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), it is desirable to be able to manage systems with flexibility and reliability by cluster management systems (e.g., HCI management systems). Hardware components of a cluster often include advanced management controllers such as baseboard management controllers (BMCs), which may enable various management technologies. Redfish® is one communications standard designed to deliver simple and secure management functionality which is supported by many management controllers.

There are multiple types of interfaces that allow for management via a management controller. Some datacenters use a dedicated management network for out-of-band management, while others may depend only on in-band management via the standard data network. In either case, however, the server management network is typically isolated from the cluster management network—either because it is a separate out-of-band network, or because VLAN isolation is used, etc. Management controllers are generally usable only via the server management network, and so cluster management software may be unable to leverage the advanced features of the management controllers that are installed in cluster nodes for direct hardware management.

Embodiments of this disclosure may provide a cluster management solution in many different host environments with many different management controller interfaces. Hosts may include (but are not limited to) hypervisors, containerized hosts, general-purpose operating systems, etc. The management controller interface can be a dedicated out-of-band network or an in-band interface.

It is to be noted that various elements discussed herein are described in the Redfish® Specification 1.14, released Sep. 22, 2021 (hereinafter, Redfish Specification), which is incorporated by reference in its entirety. One of ordinary skill in the art with the benefit of this disclosure will understand its applicability to other specifications (e.g., prior or successor versions of the Redfish Specification). Further, some embodiments may be applicable to different technologies other than Redfish®.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of clusters of information handling systems may be reduced or eliminated.

In accordance with embodiments of the present disclosure, an information handling system may include at least one processor and a memory. The information handling system may be configured to: receive, from a cluster management client, a request for functionality that is implemented at a management controller; and execute a proxy configured to: transmit the request to the management controller; receive a response from the management controller; and transmit the response to the cluster management client. In accordance with these and other embodiments of the present disclosure, a method may include an information handling system receiving, from a cluster management client, a request for functionality that is implemented at a management controller; and the information handling system executing a proxy configured to: transmit the request to the management controller; receive a response from the management controller; and transmit the response to the cluster management client.

In accordance with these and other embodiments of the present disclosure, an article of manufacture may include a non-transitory, computer-readable medium having computer-executable instructions thereon that are executable by a processor of an information handling system for: receiving, from a cluster management client, a request for functionality that is implemented at a management controller; and executing a proxy configured to: transmit the request to the management controller; receive a response from the management controller; and transmit the response to the cluster management client.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
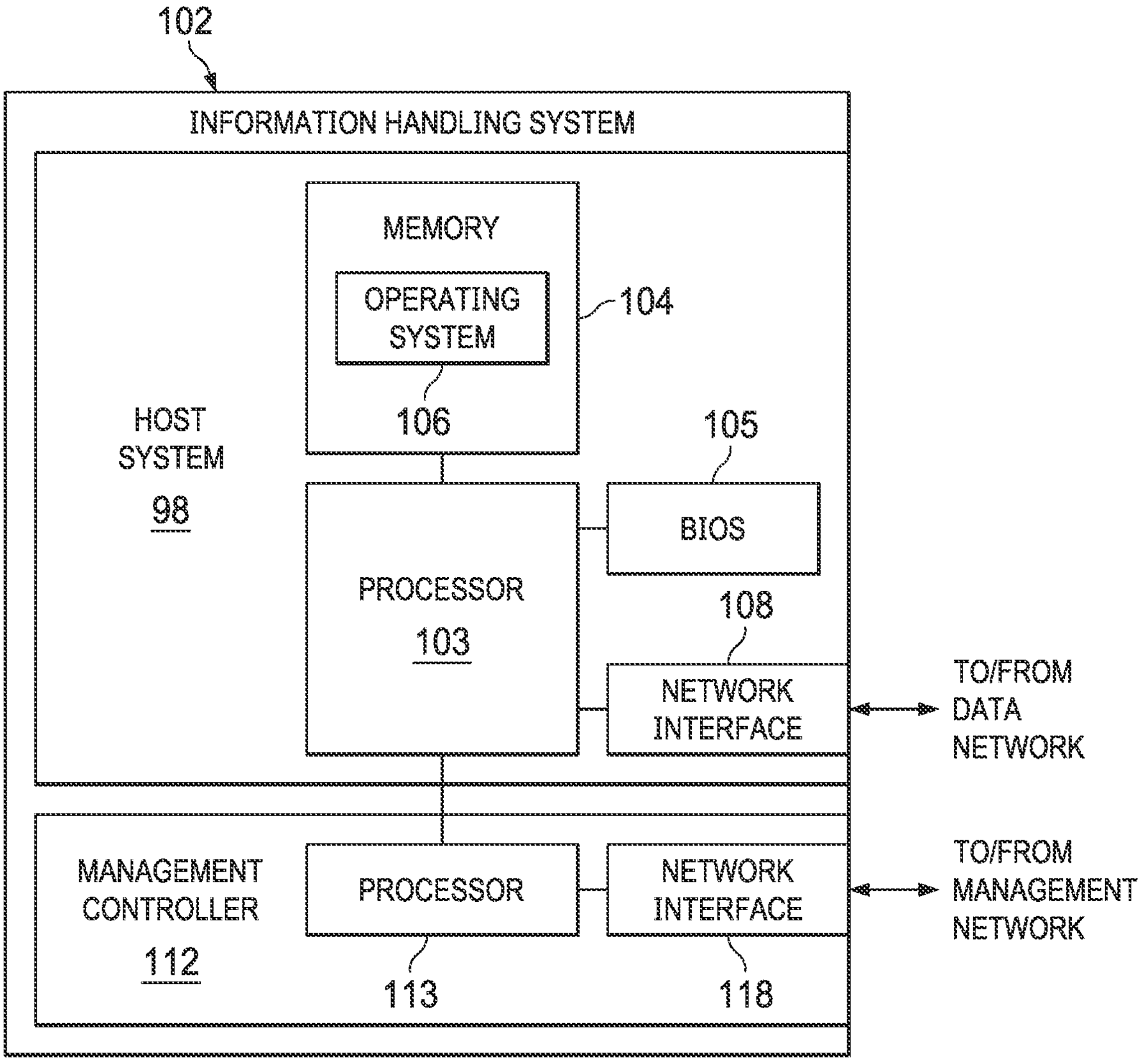
FIG. 1 illustrates a block diagram of an example information handling system, in accordance with embodiments of the present disclosure.
Figure 2:
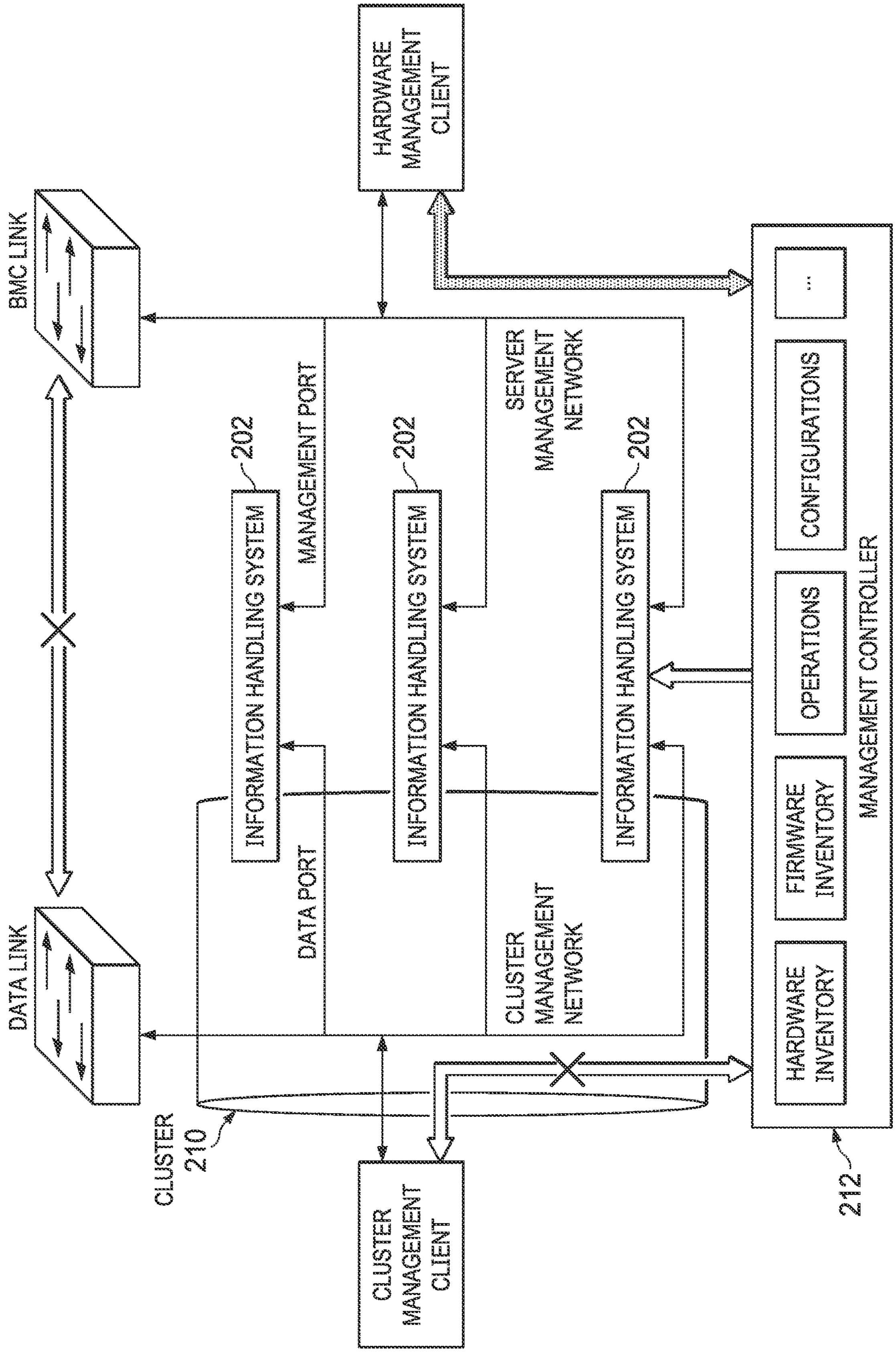
FIG. 2 illustrates a block diagram of an example datacenter, in accordance with embodiments of the present disclosure.
Figure 3:
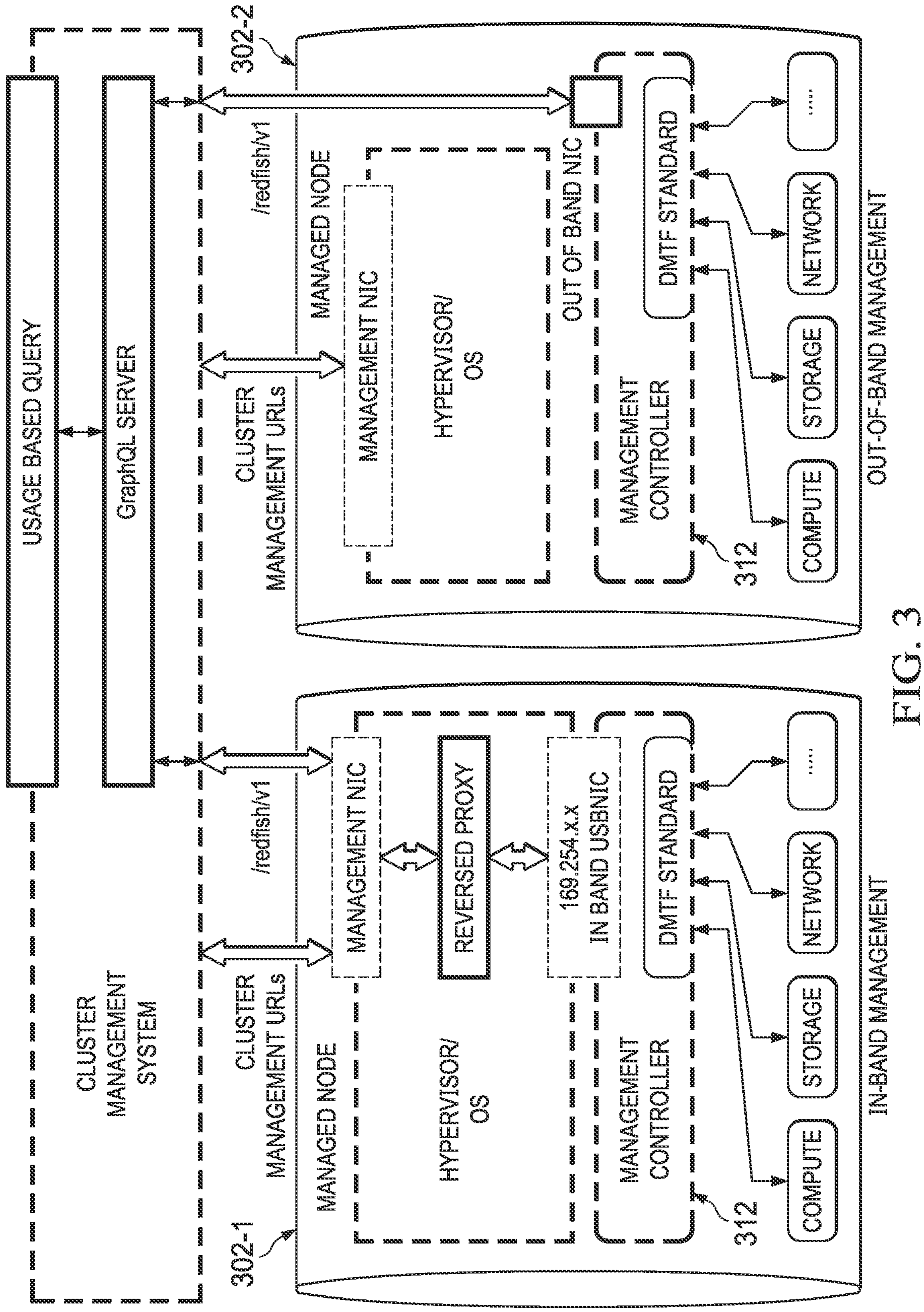
FIG. 3 illustrates a block diagram of an example datacenter, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, a server management network for information handling system 102 (whether it is hosted on the in-band data network via network interface 108 or the out-of-band management network via network interface 118) is typically isolated from the cluster management network.

FIG. 2 illustrates this arrangement. Information handling systems 202 are joined together in an HCI cluster 210, which is managed by a cluster management client over a cluster management network. Additionally, one or more management controllers 212 are used to manage the individual ones of information handling systems 202. However, the cluster management client is unable to communicate with management controller(s) 212 for direct access to the hardware of information handling systems 202.

Management controller 212 may include one or more communication pathways to information handling system 202. For example, management controller 212 may include a USB NIC to provide network connectivity, as well as other pathways (e.g., keyboard controller style (KCS) communication, Bluetooth communication, IP over USB, etc.). In particular, a driver for the USB NIC may be present in the hypervisor/OS executing on information handling system 202. As discussed in further detail below, a lightweight agent may execute on information handling system 202 in one embodiment to run a reverse proxy (e.g., a reverse HTTP and/or HTTPS proxy) configured to redirect requests for hardware management URLs from information handling system 202 to a web server that may execute on management controller 212 and listen for connections at the internal USB NIC. Any desired management controller functionality may thus be exposed and available from the cluster management software via the reverse proxy provided by information handling system 202.

Thus embodiments of this disclosure may implement a reverse proxy running in the host hypervisor or OS to provide access from a cluster management client to an in-band USB NIC of a management controller. One embodiment includes an application programming interface (API) such as a GraphQL API running in the cluster management system to distribute an administrator's API requests as appropriate to the different data sources that are accessible via management controller 212. By leveraging the rich capabilities of management controller functions that conform to a Distributed Management Task Force (DMTF) standard, the cluster management system can provide seamless hardware management in accordance with industry standards. Once a connection is set up between the host hypervisor (or OS) and the management controller, all exposed management controller functions are available in the hypervisor (or OS) itself.

Turning now to FIG. 3, another example cluster of information handling systems is shown. This cluster includes managed nodes 302-1 and 302-2 (collectively, managed nodes 302), each of which includes a management controller 312.

In particular, this cluster includes "hybrid" nodes. Managed node 302-1 is in an in-band management mode, while managed node 302-2 is in an out-of-band management mode. By integrating the two, a customer can manage their nodes flexibly with no hard dependencies on heavy OS agents or dedicated out-of-band connections for the management controllers.

In one embodiment, the internal USB NIC coupling managed nodes 302 to management controllers 312 is only visible by the specific node itself within a link local network (e.g., 169.254.0.0/16). To allow the cluster management system to access the internal USB NIC, a lightweight software agent may be introduced in the managed nodes 302. This agent may implement a reverse proxy configured to redirect hardware management URLs to a web server executing on management controller 312 and listening at the internal USB NIC.

All exposed functions of management controllers 312 may be made available from the cluster management system via this reversed proxy. Hardware management URLs can be implemented to have authentication, authorization, and accounting services enabled. Further, with the lightweight agent implementation, strict firewall rules can be applied according to specific environments.

Furthermore, this arrangement may support not only in-band server management, but out-of-band server management. If the out-of-band network interface of management controller 312 is connected and within the same network domain as the OS management NIC of managed node 302-2, the cluster management system may communicate with management controller 312 via the out-of-band network.

In one implementation, an HTTPS request to the management URL/redfish/v1 is proxied to either the in-band USB NIC as shown with respect to managed node 302-1, or directly to the out-of-band dedicated NIC as shown with respect to managed node 302-2. The response to the request may be processed by a GraphQL server executing in the cluster management software. Clients can generate their own query based on the data usage and fetch exactly the data that they want.

Using GraphQL, an API query language, the client can get exactly the data that is needed from the exposed APIs of management controllers 312. Further, data can be retrieved from multiple management controllers 312 simultaneously via either an in-band or an out-of-band network.

For example, usage-based queries can be implemented using GraphQL. This may allow the cluster management system to request runtime information such as CPU/GPU utilization, node hardware details, etc. The GraphQL server may then perform the correct queries and retrieve the information that is needed.

Although for the sake of concreteness most of this disclosure has discussed the example of cluster management software, one of ordinary skill in the art with the benefit of this disclosure will appreciate that other embodiments may be employed in any type of system.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor; and a memory;

wherein the information handling system is configured to execute a reverse proxy configured to:

receive, from a cluster management client via a cluster management network, a request for hardware management functionality relating to a node of a cluster of information handling systems, wherein the functionality is implemented at a management controller of the node, the management controller being coupled to the information handling system via an internal communication channel of the node, wherein the cluster management client is coupled to the information handling system via the cluster management network, and wherein the management controller and the internal communication channel are isolated from the cluster management network such that the cluster management client cannot communicate directly with the management controller;

redirect the request, as a hardware management URL request, to a web server executing on the management controller via the internal communication channel, wherein the management controller is configured to execute the redirected request;

receive a response to the redirected request from the management controller via the internal communication channel; and transmit the response to the cluster management client via the cluster management network.

2. The information handling system of claim 1, wherein the cluster management client is a hyper-converged infrastructure (HCI) cluster management client.

3. The information handling system of claim 1, wherein the request is transmitted to the management controller via a universal serial bus (USB) network interface controller (NIC).

4. The information handling system of claim 1, wherein the reverse proxy is executed by a hypervisor.

5. The information handling system of claim 1, wherein the information handling system is further coupled to an in-band data network, and wherein the cluster management client is configured to transmit the request to the information handling system via the in-band data network.

6. The information handling system of claim 1, wherein the management controller is further configured to communicate via an out-of-band management network with one or more other information handling systems.

7. A computer-implemented method comprising:

an information handling system executing a reverse proxy configured to:

receive, from a cluster management client via a cluster management network, a request for hardware management functionality relating to a node of a cluster of information handling systems, wherein the functionality is implemented at a management controller of the node, the management controller being coupled to the information handling system via an internal communication channel of the node, wherein the cluster management client is coupled to the information handling system via the cluster management network, and wherein the management controller and the internal communication channel are isolated from the cluster management network such that the cluster management client cannot communicate directly with the management controller;

redirect the request, as a hardware management URL request, to a web server executing on the management controller via the internal communication channel, wherein the management controller is configured to execute the redirected request;

receive a response to the redirected request from the management controller via the internal communication channel; and transmit the response to the cluster management client via the cluster management network.

8. The method of claim 7, wherein the cluster management client is a hyper-converged infrastructure (HCI) cluster management client.

9. The method of claim 7, wherein the request is transmitted to the management controller via a universal serial bus (USB) network interface controller (NIC).

10. The method of claim 7, wherein the reverse proxy is executed by a hypervisor.

11. The method of claim 7, wherein the information handling system is further coupled to an in-band data network, and wherein the cluster management client is configured to transmit the request to the information handling system via the in-band data network.

12. The method of claim 7, wherein the management controller is further configured to communicate via an out-of-band management network with one or more other information handling systems.

13. An article of manufacture comprising a non-transitory, computer-readable medium having computer-executable instructions thereon hat are executable by a processor of an information handling system executing a reverse proxy configured for:

receiving, from a cluster management client via a cluster management network, a request for hardware management functionality relating to a node of a cluster of information handling systems, wherein the functionality is implemented at a management controller of the node, the management controller being coupled to the information handling system via an internal communication channel of the node, wherein the cluster management client is coupled to the information handling system via the cluster management network, and wherein the management controller and the internal communication channel are isolated from the cluster management network such that the cluster management client cannot communicate directly with the management controller;

redirecting the request, as a hardware management URL request, to a web server executing on the management controller via the internal communication channel, wherein the management controller is configured to execute the redirected request;

receiving a response to the redirected request from the management controller via the internal communication channel; and transmitting the response to the cluster management client via the cluster management network.

14. The article of claim 13, wherein the cluster management client is a hyper-converged infrastructure (HCI) cluster management client.

15. The article of claim 13, wherein the request is transmitted to the management controller via a universal serial bus (USB) network interface controller (NIC).

16. The article of claim 13, wherein the reverse proxy is executed by a hypervisor.

17. The article of claim 13, wherein the information handling system is further coupled to an in-band data network, and wherein the cluster management client is configured to transmit the request to the information handling system via the in-band data network.

18. The article of claim 13, wherein the management controller is further configured to communicate via an out-of-band management network with one or more other information handling systems.

* * * * *